United States Patent
Simhon et al.

(10) Patent No.: US 10,261,973 B2
(45) Date of Patent: Apr. 16, 2019

(54) SYSTEM AND METHOD FOR CAUSING DOWNLOADS OF APPLICATIONS BASED ON USER INTENTS

(71) Applicant: Doat Media Ltd., Tel Aviv (IL)

(72) Inventors: Joey Joseph Simhon, Ramat-Gan (IL); Amir Taichman, Haifa (IL); Adam Kariv, Tel Aviv (IL)

(73) Assignee: Doat Media Ltd., Tel Aviv (IL)

( * ) Notice: Subject to any disclaimer, the term of this patent is extended or adjusted under 35 U.S.C. 154(b) by 0 days.

(21) Appl. No.: 15/383,249

(22) Filed: Dec. 19, 2016

(65) Prior Publication Data

US 2017/0098004 A1    Apr. 6, 2017

Related U.S. Application Data

(63) Continuation of application No. 14/103,500, filed on Dec. 11, 2013, now Pat. No. 9,529,918, and a (Continued)

(51) Int. Cl.
*G06F 16/33* (2019.01)
*G06F 16/34* (2019.01)
(Continued)

(52) U.S. Cl.
CPC ...... *G06F 16/9535* (2019.01); *G06F 16/3344* (2019.01); *G06F 16/34* (2019.01);
(Continued)

(58) Field of Classification Search
CPC ............. G06F 3/04847; G06F 3/04817; G06F 3/04842; G06F 17/30867; G06F 17/30716;
(Continued)

(56) References Cited

U.S. PATENT DOCUMENTS

| 5,911,043 A | 6/1999 | Duffy et al. |
| 6,101,529 A | 8/2000 | Chrabaszcz |

(Continued)

FOREIGN PATENT DOCUMENTS

| EP | 2288113 A1 | 2/2011 |
| JP | 2009278342 | 11/2009 |

(Continued)

OTHER PUBLICATIONS

*Alice Corp V. CLS Bank International*, 573 U.S. Pat. No. 208,134 S. CT. 2347 (2014).

(Continued)

*Primary Examiner* — Evan Aspinwall
(74) *Attorney, Agent, or Firm* — M&B IP Analysts, LLC (57) ABSTRACT

A method and system for causing downloads of applications based on user intents. The method includes determining, based on an input search query, a search intent; selecting, based on the determined search intent, at least one application from at least one applications central repository; causing, via a user device, creation of a dynamic display segment, wherein the dynamic display segment includes at least one icon corresponding to the selected at least one application; receiving, from the user device, at least one input indicating a user-selected application with respect to the at least one displayed icon; causing establishment of a direct communication link between the user device and a source of the user-selected application; and causing initiation of a download of the user-selected application on the user device over the direct communication link.

17 Claims, 4 Drawing Sheets

Related U.S. Application Data continuation-in-part of application No. 13/712,563, filed on Dec. 12, 2012, now Pat. No. 9,141,702, and a continuation-in-part of application No. 13/156,999, filed on Jun. 9, 2011, now Pat. No. 9,323,844, said application No. 13/712,563 is a continuation-in-part of application No. 13/296,619, filed on Nov. 15, 2011, now abandoned.

(60) Provisional application No. 61/890,266, filed on Oct. 13, 2013, provisional application No. 61/822,376, filed on May 12, 2013, provisional application No. 61/653,562, filed on May 31, 2012, provisional application No. 61/468,095, filed on Mar. 28, 2011, provisional application No. 61/354,022, filed on Jun. 11, 2010.

(51) Int. Cl.

| | | |
|---|---|---|
| *H04L 29/08* | (2006.01) | |
| *G06F 16/951* | (2019.01) | |
| *G06F 16/958* | (2019.01) | |
| *G06F 3/0481* | (2013.01) | |
| *G06F 3/0484* | (2013.01) | |
| *G06F 16/9535* | (2019.01) | |
| *G06F 16/00* | (2019.01) | |

(52) U.S. Cl.
CPC .......... *G06F 16/951* (2019.01); *G06F 16/972* (2019.01); *H04L 67/06* (2013.01); *G06F 3/04817* (2013.01); *G06F 3/04842* (2013.01)

(58) Field of Classification Search
CPC ......... G06F 17/30864; G06F 17/30893; H04L 67/06
USPC ......................................................... 707/706
See application file for complete search history.

(56) References Cited

U.S. PATENT DOCUMENTS

| | | | |
|---|---|---|---|
| 6,484,162 B1 | 11/2002 | Edlund et al. | |
| 6,560,590 B1* | 5/2003 | Shwe ............... | G06F 17/30684 706/55 |
| 6,564,213 B1 | 5/2003 | Ortega et al. | |
| 6,605,121 B1 | 8/2003 | Roderick | |
| 6,668,177 B2 | 12/2003 | Salmimaa et al. | |
| 7,181,438 B1 | 2/2007 | Szabo | |
| 7,266,588 B2 | 9/2007 | Oku | |
| 7,302,272 B2 | 11/2007 | Ackley | |
| 7,376,594 B2 | 5/2008 | Nigrin | |
| 7,461,061 B2 | 12/2008 | Aravamudan et al. | |
| 7,529,741 B2 | 5/2009 | Aravamudan et al. | |
| 7,533,084 B2 | 5/2009 | Holloway et al. | |
| 7,565,383 B2 | 7/2009 | Gebhart et al. | |
| 7,599,925 B2 | 10/2009 | Larson et al. | |
| 7,636,900 B2 | 12/2009 | Xia | |
| 7,774,003 B1 | 8/2010 | Ortega et al. | |
| 7,792,815 B2 | 9/2010 | Aravamudan et al. | |
| 7,797,298 B2 | 9/2010 | Sareen et al. | |
| 7,958,141 B2 | 6/2011 | Sundaresan et al. | |
| 7,966,321 B2 | 6/2011 | Wolosin et al. | |
| 7,974,976 B2 | 7/2011 | Yahia et al. | |
| 8,032,666 B2 | 10/2011 | Srinivansan et al. | |
| 8,073,860 B2 | 12/2011 | Venkataraman et al. | |
| 8,086,604 B2 | 12/2011 | Arrouye et al. | |
| 8,271,333 B1 | 9/2012 | Grigsby et al. | |
| 8,312,484 B1 | 11/2012 | McCarty et al. | |
| 8,392,449 B2 | 3/2013 | Pelenur et al. | |
| 8,571,538 B2 | 10/2013 | Sprigg et al. | |
| 8,572,129 B1 | 10/2013 | Lee et al. | |
| 8,606,725 B1 | 12/2013 | Agichtein et al. | |
| 8,626,589 B2 | 1/2014 | Sengupta et al. | |
| 8,700,804 B1 | 4/2014 | Meyers et al. | |
| 8,718,633 B2 | 5/2014 | Sprigg et al. | |
| 8,793,265 B2 | 7/2014 | Song et al. | |
| 8,799,273 B1 | 8/2014 | Chang et al. | |
| 8,825,597 B1 | 9/2014 | Houston et al. | |
| 8,843,853 B1 | 9/2014 | Smoak et al. | |
| 2003/0018778 A1 | 1/2003 | Martin et al. | |
| 2004/0186989 A1 | 9/2004 | Clapper | |
| 2004/0229601 A1 | 11/2004 | Zabawskyj et al. | |
| 2005/0071328 A1 | 3/2005 | Lawrence | |
| 2005/0076367 A1 | 4/2005 | Johnson et al. | |
| 2005/0102407 A1 | 5/2005 | Clapper | |
| 2005/0108406 A1 | 5/2005 | Lee et al. | |
| 2005/0149496 A1 | 7/2005 | Mukherjee et al. | |
| 2005/0232423 A1 | 10/2005 | Horvitz et al. | |
| 2005/0283468 A1 | 12/2005 | Kamvar et al. | |
| 2006/0031529 A1 | 2/2006 | Keith | |
| 2006/0064411 A1 | 3/2006 | Gross et al. | |
| 2006/0085408 A1 | 4/2006 | Morsa | |
| 2006/0089945 A1 | 4/2006 | Paval | |
| 2006/0095389 A1 | 5/2006 | Hirota et al. | |
| 2006/0112081 A1 | 5/2006 | Qureshi | |
| 2006/0136403 A1 | 6/2006 | Koo | |
| 2006/0167896 A1 | 7/2006 | Kapur et al. | |
| 2006/0190439 A1 | 8/2006 | Chowdhury et al. | |
| 2006/0200761 A1 | 9/2006 | Judd et al. | |
| 2006/0206803 A1 | 9/2006 | Smith | |
| 2006/0217953 A1 | 9/2006 | Parikh | |
| 2006/0224448 A1 | 10/2006 | Hert | |
| 2006/0224593 A1 | 10/2006 | Benton et al. | |
| 2006/0248062 A1 | 11/2006 | Libes et al. | |
| 2006/0265394 A1 | 11/2006 | Raman et al. | |
| 2006/0271520 A1 | 11/2006 | Ragan | |
| 2006/0277167 A1 | 12/2006 | Gross et al. | |
| 2007/0011167 A1 | 1/2007 | Krishnaprasad et al. | |
| 2007/0055652 A1 | 3/2007 | Hood et al. | |
| 2007/0082707 A1 | 4/2007 | Flynt et al. | |
| 2007/0112739 A1 | 5/2007 | Burns et al. | |
| 2007/0136244 A1 | 6/2007 | MacLaurin et al. | |
| 2007/0174900 A1 | 7/2007 | Marueli et al. | |
| 2007/0195105 A1 | 8/2007 | Koberg | |
| 2007/0204039 A1 | 8/2007 | Inamdar | |
| 2007/0239724 A1 | 10/2007 | Ramer et al. | |
| 2007/0255831 A1 | 11/2007 | Hayashi et al. | |
| 2007/0300185 A1 | 12/2007 | Macbeth et al. | |
| 2008/0065685 A1 | 3/2008 | Frank | |
| 2008/0082464 A1 | 4/2008 | Ozzie et al. | |
| 2008/0114759 A1 | 5/2008 | Yahia et al. | |
| 2008/0172362 A1* | 7/2008 | Shacham ........... | G06F 17/30696 |
| 2008/0172374 A1 | 7/2008 | Wolosin et al. | |
| 2008/0256443 A1 | 10/2008 | Li et al. | |
| 2009/0013052 A1 | 1/2009 | Robarts et al. | |
| 2009/0031236 A1 | 1/2009 | Robertson et al. | |
| 2009/0049052 A1 | 2/2009 | Sharma et al. | |
| 2009/0063491 A1 | 3/2009 | Barclay et al. | |
| 2009/0070318 A1 | 3/2009 | Song et al. | |
| 2009/0077047 A1 | 3/2009 | Cooper et al. | |
| 2009/0125374 A1* | 5/2009 | Deaton ................ | G06Q 30/02 705/7.29 |
| 2009/0125482 A1 | 5/2009 | Peregrine et al. | |
| 2009/0150792 A1 | 6/2009 | Laakso et al. | |
| 2009/0210403 A1 | 8/2009 | Reinshmidt et al. | |
| 2009/0228439 A1 | 9/2009 | Manolescu et al. | |
| 2009/0234814 A1 | 9/2009 | Boerries et al. | |
| 2009/0239587 A1 | 9/2009 | Negron et al. | |
| 2009/0240680 A1 | 9/2009 | Tankovich et al. | |
| 2009/0277322 A1 | 11/2009 | Cai et al. | |
| 2009/0285550 A1 | 11/2009 | Yamada et al. | |
| 2009/0327261 A1 | 12/2009 | Hawkins | |
| 2010/0042912 A1 | 2/2010 | Whitaker | |
| 2010/0082661 A1 | 4/2010 | Beaudreau | |
| 2010/0094854 A1 | 4/2010 | Rouhani-Kalleh | |
| 2010/0106706 A1 | 4/2010 | Rorex et al. | |
| 2010/0228715 A1 | 9/2010 | Lawrence | |
| 2010/0257552 A1 | 10/2010 | Sharan et al. | |
| 2010/0268673 A1 | 10/2010 | Quadracci | |
| 2010/0280983 A1 | 11/2010 | Cho et al. | |
| 2010/0306191 A1 | 12/2010 | Lebeau et al. | |

(56) References Cited

U.S. PATENT DOCUMENTS

| | | | |
|---|---|---|---|
| 2010/0312782 A1* | 12/2010 | Li | G06F 17/30991 707/769 |
| 2010/0332958 A1 | 12/2010 | Weinberger et al. | |
| 2011/0029541 A1 | 2/2011 | Schulman | |
| 2011/0072492 A1 | 3/2011 | Mohler et al. | |
| 2011/0078767 A1 | 3/2011 | Cai et al. | |
| 2011/0093488 A1 | 4/2011 | Amacker et al. | |
| 2011/0131205 A1 | 6/2011 | Iyer et al. | |
| 2011/0252329 A1 | 10/2011 | Broman | |
| 2011/0264656 A1 | 10/2011 | Dumais et al. | |
| 2011/0295700 A1 | 12/2011 | Gilbane et al. | |
| 2011/0314419 A1 | 12/2011 | Dunn et al. | |
| 2012/0198347 A1 | 8/2012 | Hirvonen et al. | |
| 2012/0284256 A1* | 11/2012 | Mahajan | G06F 17/3087 707/722 |
| 2013/0132896 A1 | 5/2013 | Lee et al. | |
| 2013/0166525 A1 | 6/2013 | Naranjo et al. | |
| 2013/0173513 A1 | 7/2013 | Chu et al. | |
| 2013/0219319 A1 | 8/2013 | Park et al. | |
| 2014/0007057 A1* | 1/2014 | Gill | G06F 8/61 717/126 |
| 2014/0049651 A1 | 2/2014 | Voth | |
| 2014/0279013 A1 | 9/2014 | Chelly et al. | |
| 2015/0032714 A1 | 1/2015 | Simhon et al. | |

FOREIGN PATENT DOCUMENTS

| | | | |
|---|---|---|---|
| JP | 2011044147 | | 3/2011 |
| WO | 2012083540 | A1 | 6/2012 |

OTHER PUBLICATIONS

Notice of the First Office Action for Chinese Patent Application No. 201280004300.6, State Intellectual Property Office of the P.R.C., dated Oct. 26, 2016.

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Chinese Foreign Action dated Mar. 13, 2017 from the State Intellectual Property of the P.R.C. for Chinese Patent Application: 201280004301.0, China.

"Categories App Helps Organize iPhone Apps on your iPhone's Home Screen," iPhoneHacks, url: http://www.iphonehacks.com/2008/10/categoriesapp.html, pp. 1-4, date of publication: Oct. 5, 2008.

"iOS 4.2 for iPad New Features: Folders," Purcell, url: http://notebooks.com/2010/11/22/ios-4-2-foripad-new-features-folders/, pp. 1-5, date of publication Nov. 22, 2010.

Foreign Office Action for Patent Application No. 201380000403.X date Jun. 2, 2017 by the State Intellectual Property Office of the P.R.C.

Second Office Action for Chinese Patent Application No. 201280004300.6 dated Aug. 23, 2017, SIPO.

The Second Office Action for Chinese Patent Application No. 201280004301.0 dated Jan. 19, 2018, SIPO.

Chinese Foreign Action dated Sep. 3, 2018 from the State Intellectual Property of the P.R.C for Chinese Patent Application: 201280004301.0, China.

* cited by examiner

SYSTEM AND METHOD FOR CAUSING DOWNLOADS OF APPLICATIONS BASED ON USER INTENTS

CROSS-REFERENCE TO RELATED APPLICATIONS

This application is a continuation of U.S. patent application Ser. No. 14/103,500 filed on Dec. 11, 2013, now allowed, which claims the benefit of U.S. provisional application No. 61/890,266 filed on Oct. 13, 2013, and of U.S. provisional application No. 61/822,376 filed on May 12, 2013. The Ser. No. 14/103,500 application is also a continuation-in-part of U.S. patent application Ser. No. 13/712,563 filed on Dec. 12, 2012, now U.S. Pat. No. 9,141,702. The Ser. No. 13/712,563 application claims the benefit of U.S. provisional patent application No. 61/653,562 filed on May 31, 2012, and is a continuation-in-part of U.S. patent application Ser. No. 13/156,999 filed on Jun. 9, 2011, now U.S. Pat. No. 9,323,844. The Ser. No. 13/156,999 application claims the benefit of U.S. provisional patent application No. 61/468,095 filed on Mar. 28, 2011, and of U.S. provisional application No. 61/354,022 filed on Jun. 11, 2010. The Ser. No. 13/712,563 application is also a continuation-in-part application of U.S. patent application Ser. No. 13/296,619 filed on Nov. 15, 2011.

The contents of the above-referenced applications are incorporated herein by reference.

TECHNICAL FIELD

The disclosure generally relates to techniques for searching for mobile applications ("apps") to provide to a user, and more specifically to techniques for searching for applications based on the intent of a user.

BACKGROUND

The use of mobile devices such as smart phones, mobile phones, tablet computers, and other similar devices has significantly increased in the past years. Such mobile devices allow access to a variety of application programs also known as "applications" or "apps."

The applications are usually designed to help a user of a mobile device in performing a specific task. Applications may be bundled with the computer and its system software, or may be accessible and sometimes downloadable from a central repository such as, for example, the App Store™ by Apple®, and the like.

Through the central repositories hosting applications, users are able to search for applications using search engines. When a user finds a desired application, a link is provided through which the application is downloaded to the mobile device. The applications are sometimes downloadable straight from the repository.

In the central repositories, applications are typically organized according to different categories, such as books, games, educational applications, and so on. A user can start the search for an application by first selecting a category of interest and then navigating through the applications listed under the selected category. To narrow the search a user can filter the listed applications in the selected category to 'paid,' 'free,' and 'top rated' applications. Alternatively, the user can search for applications using keywords. However, in such a case the user needs to know at least the name of the desired application, as the search results include all applications that the input keyword exists in. For example, the keyword 'ticket' would return a list of applications that offer tickets for movies, sport events, and concerts in different cities around the world. If the user who searched by the keyword "ticket" is interested only in movie tickets for a local theater, the user will need to review a list of irrelevant applications to find an application related to his particular desired topic. The order of the applications presented to the user is usually not based on the relevancy to the user. Thus, the process for searching for an application is very time consuming, as the process requires navigation through tens or hundreds of applications. This longevity of the process occurs because, among other causes, the applications retuned in response to the search are commonly promoted by the repository's owner, even if such applications do not meet the exact user's needs or intent.

It would therefore be advantageous to provide an application search solution that overcomes the limitations of current search solutions as discussed above.

SUMMARY

Certain embodiments disclosed herein include a method for causing downloads of applications based on user intents. The method comprises: determining, based on an input search query, a search intent; selecting, based on the determined search intent, at least one application from at least one applications central repository; causing, via a user device, creation of a dynamic display segment, wherein the dynamic display segment includes at least one icon corresponding to the selected at least one application; receiving, from the user device, at least one input indicating a user-selected application with respect to the at least one displayed icon; causing establishment of a direct communication link between the user device and a source of the user-selected application; and causing initiation of a download of the user-selected application on the user device over the direct communication link.

Certain embodiments disclosed herein also include a non-transitory computer readable medium having stored thereon instructions for causing a processing circuitry to perform a process, the process comprising: determining, based on an input search query, a search intent; selecting, based on the determined search intent, at least one application from at least one applications central repository; causing, via a user device, creation of a dynamic display segment, wherein the dynamic display segment includes at least one icon corresponding to the selected at least one application; receiving, from the user device, at least one input indicating a user-selected application with respect to the at least one displayed icon; causing establishment of a direct communication link between the user device and a source of the user-selected application; and causing initiation of a download of the user-selected application on the user device over the direct communication link.

Certain embodiments disclosed herein also include a system for causing downloads of applications based on user intents. The system comprises: a processing circuitry; and a memory, the memory containing instructions that, when executed by the processing circuitry, configure the system to: determine, based on an input search query, a search intent; select, based on the determined search intent, at least one application from at least one applications central repository; cause, via a user device, creation of a dynamic display segment, wherein the dynamic display segment includes at least one icon corresponding to the selected at least one application; receive, from the user device, at least one input indicating a user-selected application with respect to the at least one displayed icon; cause establishment of a direct communication link between the user device and a source of the user-selected application; and cause initiation of a download of the user-selected application on the user device over the direct communication link.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
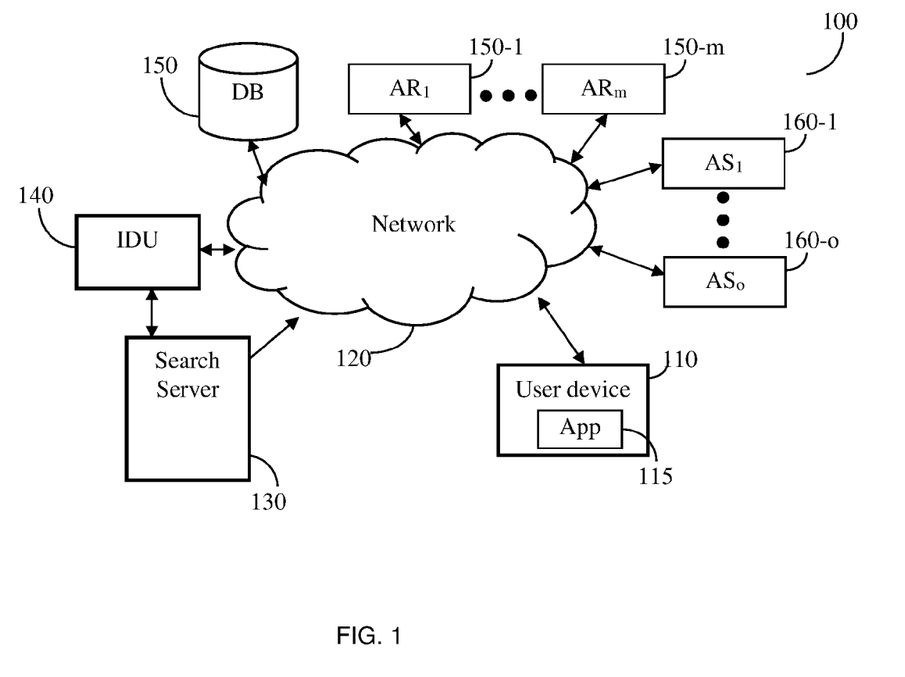
FIG. 1 is a schematic diagram of a system utilized to describe certain embodiments disclosed herein.

FIG. 1 depicts an exemplary and non-limiting schematic diagram of a system 100 utilized to describe certain disclosed embodiments. As illustrated in FIG. 1, a user device 110 is communicatively connected to a network 120. The user device 110 may be, but is not limited to, a personal computer (PC), a laptop, a tablet computer, a mobile phone, a smart phone, a portable device having a processing unit integrated therein, and the like.

The network 120 may be, but is not limited to, a local area network (LAN), a wide area network (WAN), a metro area network (MAN), the world wide web (WWW), the Internet, a wired network, a wireless network, and the like, as well as any combination thereof. Also communicatively connected to the network 120 is a search server 130, an intent detection unit (IDU) 140, a plurality of applications repositories 150, a plurality of web sources 160-1 through 160-o, and a database 170. In an embodiment, the IDU 140 may be integrated in the search server 130.

The applications repositories 150 are web sources that contain links to web sources 160-1 through 160-o, through which applications can be downloaded to the user device 110. According to another embodiment, the applications may be downloadable directly from the applications repositories. Examples of applications repositories 150 are the AppStore®, Google Play® and the like. The web sources 160 may include "cloud-based" applications, that is, applications executed by servers in a cloud-computing infrastructure such as, but not limited to, a private-cloud, a public-cloud, or any combination thereof. The cloud-computing infrastructure is typically realized through a data center.

According to one embodiment, the database 170 includes an index of applications that can be downloaded from applications central repositories. Each application is indexed using a corresponding identification tag or name. In addition, the index contains a corresponding rank in the respective data repository and a URL from which the application be downloaded for each application. The index can be organized according to the different operating systems that the applications are programmed to be executed on. For example, an index can be organized to separately list applications programmed to run on iOS®, on Android®, and on Windows® operating system.

The search server 130 is configured to search for applications that would best match a user of the device 110. To this end, the search server 130 receives an input search query from the user device. The input search query may be a text query, a portion of a text query, or a voice query. Then, the server 130 is configured to send the received query to the IDU 140 to determine the search intent of a user of the user device 110. The search intent represents the type of content, the content, actions, or a combination thereof, that currently may be of an interest to the user.

Specifically, the intent represents an application category, an application name, or both, that would best match the user's input query. In one embodiment, the intent is implicitly determined ("implicit intent") based on environmental variables, personal variables, or both, received from the user device 120. An environmental variable includes, for example, a temperature, a location, a set of GPS coordinates, a current time, the user device 110's movement, and so on. A personal variable includes, for example, the user profile, demographic information, the user's preferences, and so on.

In an example embodiment, the process for determining the implicit intent includes receiving personal variables, environmental variables, or both from a user device; analyzing each of the personal variables and/or environmental variables to determine their context; correlating the personal variables and/or environmental variables based on their respective context; and using the correlation results to derive at least a category of interest. The category of interest is determined to be the intent. As an example, if the user enters the query "eat" and the environmental variables are the current time (e.g., 8 A.M.) and a location of a train station, then the implicit intent would be to search for "restaurants for breakfast." The process for determining the implicit intent is further described in the above-referenced U.S. Pat. No. 9,141,702 filed on Dec. 12, 2012, titled "METHOD FOR DYNAMICALLY DISPLAYING A PERSONALIZED HOME SCREEN ON A DEVICE", assigned to common assignee, and which is hereby incorporated by reference for all that it contains.

It should be noted that the IDU 140 is configured to determine search intent only based on the input query (hereinafter "explicit intent") as discussed below with reference to FIGS. 3 and 4 as well as to determine the implicit intent as noted above. The search intent as determined by the IDU 140 is provided to the search server 130.

Respective of the determined search intent (the explicit intent, implicit intent, or both) one or more applications are selected for download to the user device from the applications repositories 150. In an embodiment, the search engine first searches for applications that match the search intent in the application index stored in the database. If at least one application is found, the search server 130 downloads the application from a location indicated by the application's URL as saved in the index. If a matching application cannot be found in the index, then the search engine searches for the application in the applications repositories 150 and the web sources 160.

Upon selection of at least one application (i.e., an application that matches the intent), a dynamic display segment is created on the user device. An icon of the selected application is displayed over the created dynamic display segment. Thereafter, upon identification of an input received from the user device 110-1 respective of at least one representative icon, the server 130 is configured to establish a direct communication link between the user device and the location that stores the selected application and initiates the download of the application to the user device. According to one embodiment, the input received from the user device 110 is a user's gesture. The user's gesture may be, for example, a scroll on the application icon, a tap on the application icon, and the like. The location storing the downloaded application may be one or more of the web sources 160 and the application repositories 150.

In a non-limiting embodiment, the system 100 may further include an agent 115 installed locally on the user device 110. The agent 115 is configured to facilitate communication with the search server 130. In an embodiment, the agent 115 is realized as an application (mobile app), wherein instructions of such an application are saved in a memory and executed by a processor of the user device 110. It should be noted that the one user device 110 is illustrated in FIG. 1 only for the sake of simplicity and without limitation on the generality of the disclosed embodiments.

Figure 2:
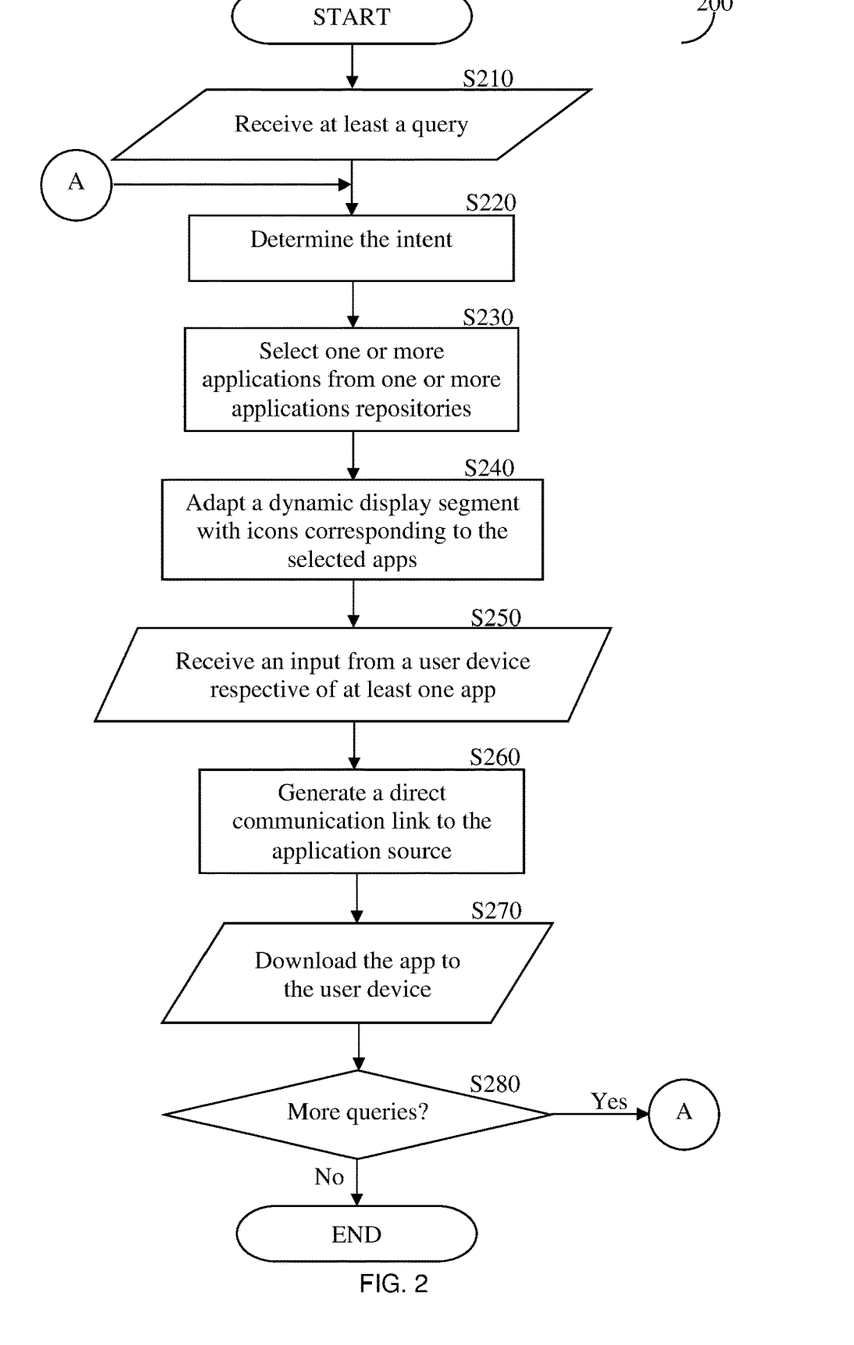
FIG. 2 is a flowchart describing the operation of downloading applications to a user device according to an embodiment.

FIG. 2 depicts an exemplary and non-limiting flowchart 200 of a method for downloading applications to a user device according to one embodiment. In S210, at least one search query or a portion thereof is received from a user device. The query is received at a search server. The user device typically communicates additional information to the server, such as an operation system type, a user identifier, and the like. The input query can be a text query or a voice query, and the text query may be a free text query or a structured query.

In S220, the search intent of a user of the user device 110 is determined. The search intent may be an implicit intent and/or an explicit intent, as further described and below with respect to FIGS. 3 and 4. As discussed above, the implicit intent may be determined by the IDU 140 based solely on the at least one variable and respective thereto. In such an embodiment, the search intent can be determined using an implicit query, or with no query at all.

In S230, at least one application is selected to match the determined search intent. The search can be performed against an index of applications or applications repositories 150-1 through 150-m. In addition to searching based on the intent, the search is performed only for applications that their execution can be supported by the operating system of the server device.

In S240, a dynamic display segment is created on the user device. At least one icon corresponding to the at least one selected application is displayed on the user's segment. In S250, at least one input is received from the user device 120 that the user wishes to install the at least one selected application. Such an input may be, for example, a user tapping on the displayed icon. If the user decides not to the downloaded application that a new icon of another matching application can be displayed in the segment display. If no applications are available execution continues with S280.

In S260, respective of the selection, a direct communication link is established between a source of the at least one selected application and the user device to initiate the application download to the device.

In S270, the at least one application is downloaded to the user device 110. According to one embodiment, in S270 the application may further be installed and/or executed on the user device 110. In S280, it is checked whether there are additional queries and if so, execution continues with S220; otherwise, execution terminates.

An application discussed herein includes, but is not limited to, a native application (also known as "Internet mobile application") and a web application. A native application is any software application that runs on a user device 120 and can, but is not required to, be accessed using the Internet or via a connection to the Internet. Typically, a native application is installed on smart phones or tablet computers (Apps for Apple's iPhone® and iPAD®). Examples of native applications include applications that play movies, applications that download songs, applications through which a user can order a pizza, applications through which a user can request an electrician to make a house call, and the like. A web application is any application that can be accessed on the World Wide Web (WWW) via a web browser. Typically, a web application is executed by a web server and the user's device (client) receives the processing results such as, for example, a web application for booking flight tickets.

Figure 3:
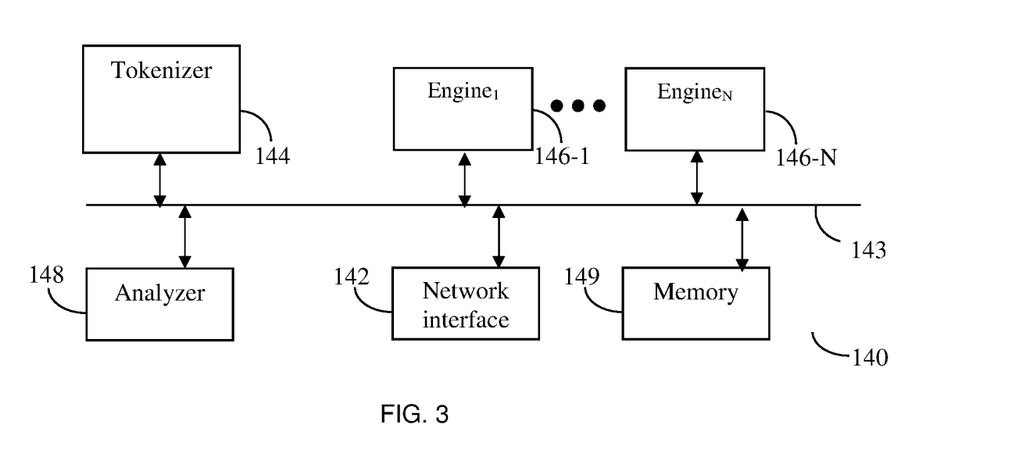
FIG. 3 is a schematic block diagram of an intent detection unit (IDU) for detecting a search intent of a user according to an embodiment.

FIG. 3 depicts an exemplary and non-limiting schematic diagram of the IDU 140 according to an embodiment. The IDU 140 includes a network interface 142, a tokenizer 144, a plurality of engines 146-1 through 146-N, an analyzer 148, and a memory 149. The network interface 142 provides connectivity to the network 120 and is configured to receive queries from the search server 130 or directly from a user device 110. The network interface 142 may further be used to communicate with the database 150 to retrieve information therefrom. The elements of the IDU 140 are communicatively coupled using a communication bus 143.

The tokenizer 144 is configured to tokenize an input query to units of information (tokens). The tokenizer 144 arranges the tokens in tokenized paths to enable efficient processing by the engine 146. Each token may be, but is not limited to, a word or a series of words, or a number or a series of numbers. According to one embodiment, the tokenizer 144 may also include a filtering unit (not shown) for filtering the input query. The input queries can be classified to three different types: definitive, fuzzy, and noisy. A definitive query is short and is mapped to known entities or keywords. A fuzzy query contains a combination of known entities and keywords that are uncorrelated to the known entities. Noisy queries cannot be mapped to known entities, or are long and complex. According to the disclosed embodiments, an entity is an "object" in the world that can be defined with known types and attributes. Entities may be, for example, products, people, locations, companies, music bands, popular keywords, applications, zip codes, and query components. Each entity can be associated with one or more classifications describing its essence. For example, an entity 'Madonna' can be associated with the classifications singer, actor, and celebrity.

The filtering process is designed to simplify at least fuzzy and noisy queries. The filtering process may include removing one or more unnecessary tokens (such as preposition words) from the query. As an example, if the received query is "where there in Tolsa", the word "in" may be removed from the query if the determined to be unnecessary. A list of unnecessary tokens is defined in a semantic dictionary maintained in the database 150 or the memory 149.

The tokenized paths created by the tokenizer 144 are based on the fact that the coherent query typically includes a set of tokens (map to entities as defined above) that represent similar intents. According to one embodiment, any ambiguity between paths is resolved by using the most coherent and probable path among all possible tokenized paths. In one embodiment, a graph of connections between entities (e.g., singers connected to their songs) is utilized to evaluate the likelihood of a certain tokenized paths yielding the user's intended search result based on the connection of tokens (mapped to entities) in the same query. For example, the input query "madonna vogue" includes two tokens "madonna" and "vogue", where the tokenized path is that the entire query deals with music, rather than a Vogue magazine article ("Vogue" is both the name of a Madonna song and the title of a magazine).

Each engine of the plurality of engines 146 is configured to handle different one or more topics of interest. In one embodiment, a set of engines 146 are configured to map input tokenized paths or tokens (hereinafter tokenized queries) to entities. As noted above entities are objects that can be defined using a set of attributes such as consumer goods, locations, keywords, mobile applications (apps), person names, questions, URLs, and so on.

As a non-limiting example, an engine 146 that is configured to handle locations, search for place names (cities, states, countries) in the tokenized query, and compute the probability that the user added a location to in their input queries. As another non-limiting example, an engine 146 that handles the names of people computes the probability that a given n-gram in the tokenized query is the name of an unknown person. Such an engine uses a frequency dictionary for common names versus common words, and common last name suffixes. In the fields of computational linguistics and probability, an n-gram is a contiguous sequence of n items from a given sequence of text or speech.

As another non-limiting example, an engine 146 that handles URLs is configured to include a list of URLs, domain names, and websites, and to compute the probability that the tokenized query includes a website name. As another non-limiting example, an engine 146 computes the probability that the tokenized query includes a question word, thereby determining the probability that the entire input query is a question. This is performed using pattern matching.

According to one embodiment, the probability may be computed based on at least one of: the frequency of appearance of the tokenized query within the entities by the engines, the correlation of the tokenized query to the entities, the matching between each of the tokens to the entities, the matching of the tokenized query to a plurality of search results received from an external search engine, the correlation to trend reports, and combinations thereof. As noted above, entities represent topics of interests.

The engines 146 are periodically updated with relevant content and are therefore consistent with the trends related to the respective topics. As a non-limiting example, the entities are updated by periodically downloading an index of entities from external sources (e.g., freebase.org) and names relevant mobile apps that can be periodically downloaded from central repositories of such applications, e.g., App-Store®.

In one embodiment, trends or popularity reports of certain keywords or queries are retrieved from external sources. Such reports can be input to engines 146 and can be utilized in part to compute the probability of a certain entity. For example, a trend report shows that a keyword "JFK airport" is currently trendy, so the probability computed for the location JFK airport would be higher than the probability computed for the person President John F. Kennedy.

Each engine of the plurality of engines 146 then provides an output respective of the tokenized query. Such output includes the mapped entity from the engine 146 and a certainty score for the tokenized query based on the probability computed for the entity handled by a respective engine. That is, each certainty score reflects the matching of the tokenized query to the topic of which the corresponding engine handles. In an exemplary embodiment, the certainty score is an integer number between 0 and 10. In one embodiment, a certainty score that does not exceed a predefined threshold is not output by the engine 146.

The outputs of the engines 146 are then analyzed by an analyzer 148 and the search intent is determined respective to the analysis. The analysis of the analyzer 148 may include: a statistical analysis, a semantic analysis, analysis of the user experience, and combinations thereof. The statistical analysis determines the co-occurrence of the tokens within the topics of interest of the engine. The semantic analysis determines at least one of: the type of each of the one or more tokens, the correlation between each of the tokens and the topic of interest of the engine, and a combination thereof.

The statistical analysis is performed to determine, based on the certainty scores, which entities would best describe the search intent of an input query. This may include statistically combining the outputs from engines 146. In another embodiment, the statistical analysis including computing an average over the received certainty scores and considering entities with certainty scores over the computed average. The semantic analysis determines which of the combination of tokens mapped to entities describes a coherent query (or phrase).

The user intent is then sent to the search server 130 in order to provide the user with appropriate search results. It should be noted that each of the units may include a processor coupled to a memory (both are not shown).

As a non-limiting example, the words "March madness" are received as a query by the network interface 142. The query is tokenized by the tokenizer 144 to the tokenized queries "March", "madness" and "March madness". The tokenized queries are then sent to a plurality of engines 146. An engine (e.g., engine 146-1) that handles dates will provide a high certainty score (e.g., 10) for the word "March" and the certainty of this word as the 3rd Month of the year, but this engine 146-1 will not provide an output for the tokenized queries "madness" and "March Madness", or otherwise the computed score is below a predefined threshold. An engine (e.g., engine 146-2) that handles a music entity will provide a high certainty score (e.g., 7) for the word "madness" and the certainty of this word as the name of a Music band, but engine 146-2 will not provide an output for the tokenized queries "March" and "March Madness." An engine (e.g., engine 146-3) that handles a basketball will output a high certainty score (e.g., 10) for the tokenized query "March Madness" and the certainty of this combination of words as a basketball related phrase. Respective thereto the search intent is determined to be basketball, as a coherent query is comprised of entities that best represent the intent.

Figure 4:
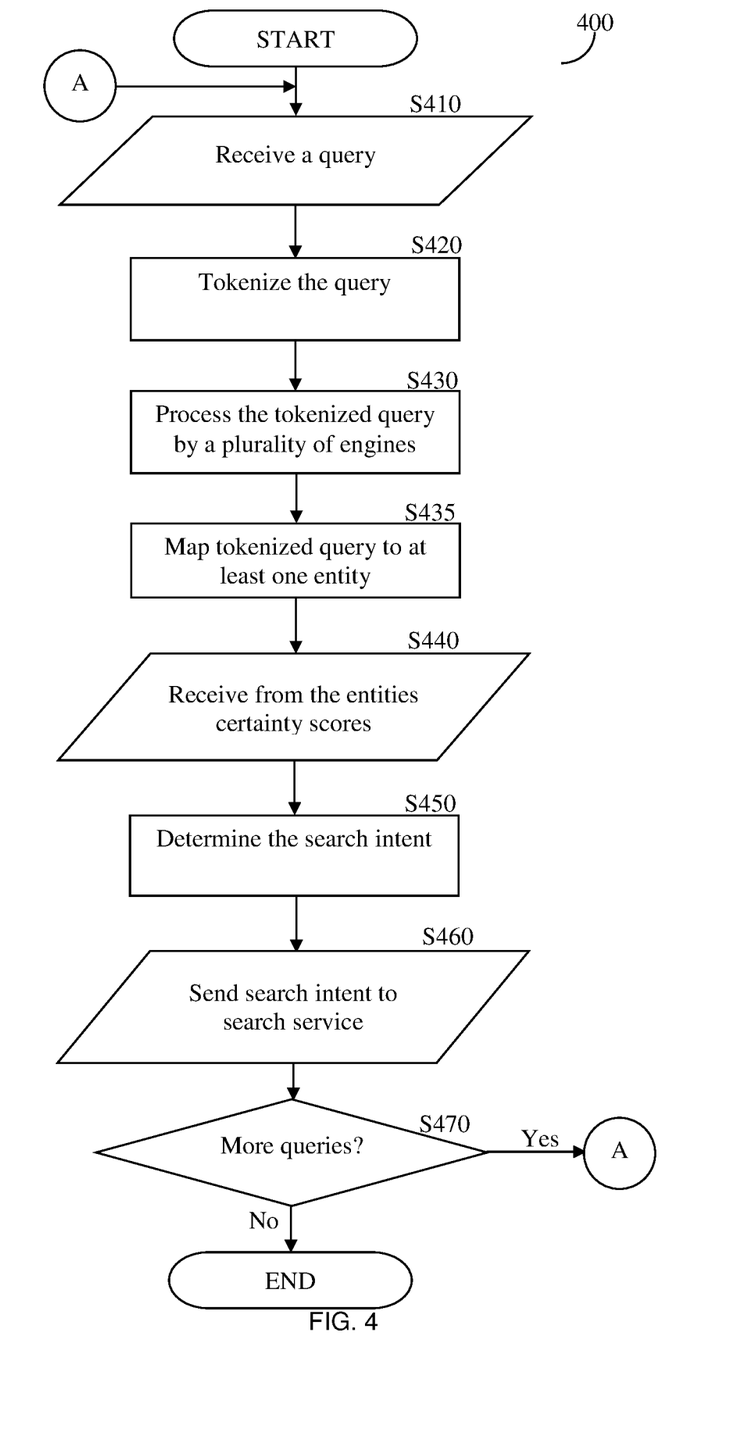
FIG. 4 is a flowchart describing the operation of detecting a search intent of a user according to an embodiment.

FIG. 4 depicts an exemplary and non-limiting flowchart 400 of a method for detecting a search intent of a user submitting a search query according to one embodiment. In S410, a query, or a portion thereof is received from a user device, for example the user device 110. The input query can be a text query or a voice query, and the text query would include a free text query or a structured query. In an embodiment, the user device is a hand held device. Therefore, in that embodiment, the user tends to type shorter queries as it is often inconvenient to type long phrases using hand held devices.

In S420, the received query is tokenized to one or more tokenized queries. A tokenized query may be any combination of tokens broken from the input query. A token may be a word or phrase that appears in the input query. In an embodiment, S420 is performed by the tokenizer 146. In S430, the tokenized queries are input to the plurality of engines 146-1 through 146-N. In S435, each engine computes the probability that a tokenized query is mapped to at least entity that the engine is configured with. An entity represents a topic of interest. Various examples of engines and their entities are discussed above. The probability computation is realized by a certainty score. In S440, each of the engines 146-1 through 146-N provides at least one entity together with a certainty score. As an example, the tokenized query 'madonna' can be mapped to the entities: 'musician' and 'religious figure'. As noted above, in an embodiment, certainty scores below a predefined threshold are not output by the engines. In S450, at least a statistical analysis, a semantic analysis, or both is performed on at least the certainty scores and entities received from the engines to determine the search intent of the user. In S460, the determined search intent is returned to a search server. In an embodiment, the tokenized queries and the search intent are saved in the memory 149. In S470, it is checked whether a new query is received, and if so execution continues with S410; otherwise, execution terminates.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer implemented method performed at a server for causing downloads of applications, comprising:
  receiving, at the server, a user intent that was determined based on tokenizing an input search query received from a user device that was tokenized into at least one tokenized query, wherein the tokenizing further comprises creating a plurality of tokens based on the search query, and transmitting the at least one tokenized query to a plurality of engines, wherein each engine is configured with at least one entity, wherein each entity represents a topic of interest, and wherein each of the plurality of engines is further configured to map the at least one tokenized query to at least one topic of interest wherein the search intent is determined based, in part, on the at least one topic of interest;
  selecting, at the server, based on the determined search intent, at least one application from at least one application's central repository;
  causing, by the server, creation of a dynamic display segment at the user device, wherein the dynamic display segment includes at least one icon corresponding to the selected at least one application;
  receiving, by the server from the user device, at least one input indicating a user-selected application with respect to the at least one icon;
  causing, by the server, establishment of a direct communication link between the user device and the at least one application's central repository; and
  causing, by the server, initiation of a download of the user-selected application on the user device over the direct communication link.

2. The method of claim 1, wherein determining the search intent further comprises:
  receiving, from each of the plurality of engines, at least one topic of interest mapped to the plurality of engines and at least one certainty score, wherein each certainty score indicates a probability that a tokenized query of the at least one tokenized query is mapped to the at least one topic of interest mapped to the plurality of engines, wherein the search intent is determined based further on the received at least one topic of interest and at least one certainty score.

3. The method of claim 2, wherein each received certainty score is above a predetermined threshold.

4. The method of claim 2, wherein determining the search intent of the user further comprises:
statistically analyzing the received at least one topic of interest and at least one certainty score, wherein the statistical analysis includes determining a co-occurrence of the at least one tokenized query within the at least one topic of interest of each of the plurality of engines, wherein the search intent of the user is determined further based on the determined co-occurrences.

5. The method of claim 1, wherein determining the search intent of the user further comprises:
semantically analyzing the at least one tokenized query, wherein the semantic analysis includes determining a combination of the at least one tokenized query that describes a coherent query.

6. The method of claim 1, wherein tokenizing the search query into at least one tokenized query further comprises:
filtering, based on a list of unnecessary tokens, at least one unnecessary token from the search query.

7. The method of claim 1, wherein determining the search intent further comprises:
receiving at least one environmental variable and at least one personal variable;
analyzing each of the at least one personal variable and the at least one environmental variable to determine a context;
correlating each of the received at least one personal variable and at least one environmental variable based on their respective contexts; and
deriving, based on the correlation, at least a category of interest, wherein the search intent is determined based further on the category of interest.

8. The method of claim 1, further comprising:
receiving, from the user device, the input search query and information related to applications supported by the user device, wherein the at least one application is selected based further on the information related to applications supported by the user device.

9. A non-transitory computer readable medium having stored thereon instructions for causing a processing circuitry to perform a process at a server, the process comprising:
receiving, at the server, a user intent that was determined based on tokenizing an input search query received from a user device into at least one tokenized query, wherein, the tokenizing further comprises creating a plurality of tokens based on the search query, and transmitting the at least one tokenized query to a plurality of engines, wherein each engine is configured with at least one entity, wherein each entity represents a topic of interest, and wherein each of the plurality of engines is further configured to map the at least one tokenized query to at least one topic of interest wherein the search intent is determined based, in part, on the at least one topic of interest;
selecting, at the server, based on the determined search intent, at least one application from at least one application's central repository;
causing, by the server, creation of a dynamic display segment at the user device, wherein the dynamic display segment includes at least one icon corresponding to the selected at least one application;
receiving, by the server from the user device, at least one input indicating a user-selected application with respect to the at least one icon;
causing, by the server, establishment of a direct communication link between the user device and the at least one application's central repository; and
causing, by the server, initiation of a download of the user-selected application on the user device over the direct communication link.

10. A sever for causing downloads of applications, comprising:
a processing circuitry; and
a memory, the memory containing instructions that, when executed by the processing circuitry, configure the sever to:
receive a user intent that was determined based on tokenizing an input search query received from a user device into at least one tokenized query, wherein the tokenizing further comprises creating a plurality of tokens based on the search query, and transmit the at least one tokenized query to a plurality of engines, wherein each engine is configured with at least one entity, wherein each entity represents a topic of interest, and wherein each of the plurality of engines is further configured to map the at least one tokenized query to at least one topic of interest wherein the search intent is determined based, in part, on the at least one topic of interest;
select, based on the determined search intent, at least one application from at least one application's central repository;
cause creation of a dynamic display segment at the user device, wherein the dynamic display segment includes at least one icon corresponding to the selected at least one application;
receive, from the user device, at least one input indicating a user-selected application with respect to the at least one icon;
cause establishment of a direct communication link between the user device and the at least one application's central repository; and
cause initiation of a download of the user-selected application on the user device over the direct communication link.

11. The system of claim 10, wherein the system is further configured to:
receive, from each of the plurality of engines, at least one topic of interest mapped to the plurality of engines and at least one certainty score, wherein each certainty score indicates a probability that a tokenized query of the at least one tokenized query is mapped to the at least one topic of interest mapped to the plurality of engines, wherein the search intent is determined based further on the received at least one topic of interest and at least one certainty score.

12. The system of claim 11, wherein each received certainty score is above a predetermined threshold.

13. The system of claim 11, wherein the system is further configured to:
statistically analyze the received at least one topic of interest and at least one certainty score, wherein the statistical analysis includes determining a co-occurrence of the at least one tokenized query within the at least one topic of interest of each of the plurality of engines, wherein the search intent of the user is determined further based on the determined co-occurrences.

14. The system of claim 10, wherein the system is further configured to:

semantically analyze the at least one tokenized query, wherein the semantic analysis includes determining a combination of the at least one tokenized query that describes a coherent query.

15. The system of claim 10, wherein the system is further configured to:

filter, based on a list of unnecessary tokens, at least one unnecessary token from the search query.

16. The system of claim 10, wherein the system is further configured to:

receive at least one environmental variable and at least one personal variable;

analyze each of the at least one personal variable and the at least one environmental variable to determine a context;

correlate each of the received at least one personal variable and at least one environmental variable based on their respective contexts; and derive, based on the correlation, at least a category of interest, wherein the search intent is determined based further on the category of interest.

17. The system of claim 10, wherein the system is further configured to:

receive, from the user device, the input search query and information related to applications supported by the user device, wherein the at least one application is selected based further on the information related to applications supported by the user device.

\* \* \* \* \*